United States Patent
Roth

(10) Patent No.: US 7,188,809 B1
(45) Date of Patent: *Mar. 13, 2007

(54) DEFORMABLE CLAMP EMPLOYED TO STIFFEN HANGER ROD

(76) Inventor: Steven A. Roth, P.O. Box 0933, Alamo, CA (US) 94507

( * ) Notice: Subject to any disclaimer, the term of this patent is extended or adjusted under 35 U.S.C. 154(b) by 156 days.

This patent is subject to a terminal disclaimer.

(21) Appl. No.: 10/319,278

(22) Filed: Dec. 11, 2002

Related U.S. Application Data

(63) Continuation-in-part of application No. 09/927,801, filed on Aug. 9, 2001, now abandoned, which is a continuation-in-part of application No. 09/870,077, filed on May 30, 2001, now abandoned, which is a continuation-in-part of application No. 09/836,955, filed on Apr. 17, 2001, now Pat. No. 6,454,232, which is a continuation-in-part of application No. 09/610,510, filed on Jul. 6, 2000.

(51) Int. Cl.
*E21F 17/02* (2006.01)
(52) U.S. Cl. ....................................... 248/58
(58) Field of Classification Search ............. 248/58, 248/62, 63, 74.1, 74.2
See application file for complete search history.

(56) References Cited

U.S. PATENT DOCUMENTS

| 2,303,108 | A | * | 11/1942 | Blackburn | 248/61 |
| 2,417,269 | A | * | 3/1947 | Robertson | 248/61 |
| RE29,332 | E | * | 8/1977 | Bilbro et al. | 165/164 |
| 4,068,966 | A | * | 1/1978 | Johnson et al. | 403/397 |
| 4,203,186 | A | * | 5/1980 | Horner | 29/890.045 |
| 4,445,255 | A | * | 5/1984 | Olejak | 24/284 |
| 4,884,528 | A | * | 12/1989 | Steudler, Jr. | 119/72.5 |
| 5,409,196 | A | * | 4/1995 | Specht | 256/54 |
| 5,474,268 | A | * | 12/1995 | Yu | 248/61 |
| 5,819,374 | A | * | 10/1998 | Chiles et al. | 24/16 PB |
| 6,317,933 | B1 | * | 11/2001 | Suenaga | 24/16 R |
| 6,581,884 | B1 | * | 6/2003 | Gretz | 248/74.1 |
| 6,783,104 | B1 | * | 8/2004 | Roth | 248/230.1 |
| 6,811,130 | B1 | * | 11/2004 | Oh | 248/343 |

* cited by examiner

*Primary Examiner*—A. Joseph Wujciak, III
(74) *Attorney, Agent, or Firm*—Thomas R. Lampe

(57) ABSTRACT

Stiffener apparatus for stabilizing a hanger rod includes a clamp having a mechanical fastener extending through openings formed in spaced clamp segments. The clamp is constructed of deformable material so that the clamp segments bend into engagement with the hanger rod to urge the hanger rod toward an elongated stiffener member positioned between a closed end of the clamp and the hanger rod when the mechanical fastener is tightened.

3 Claims, 4 Drawing Sheets

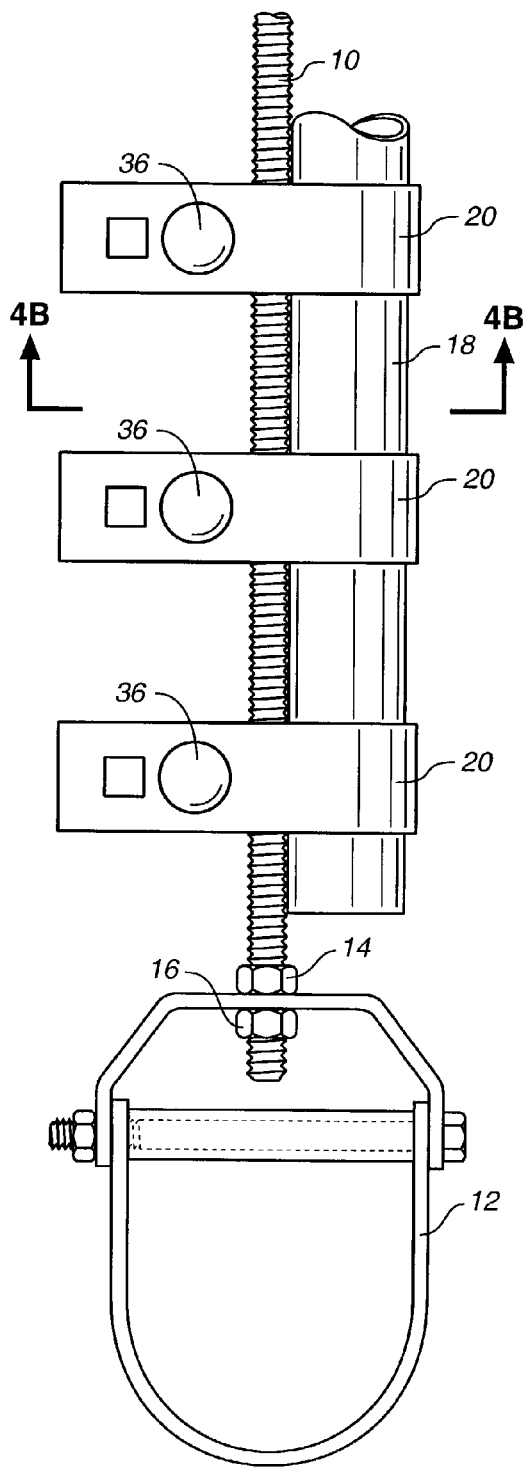
FIG._1
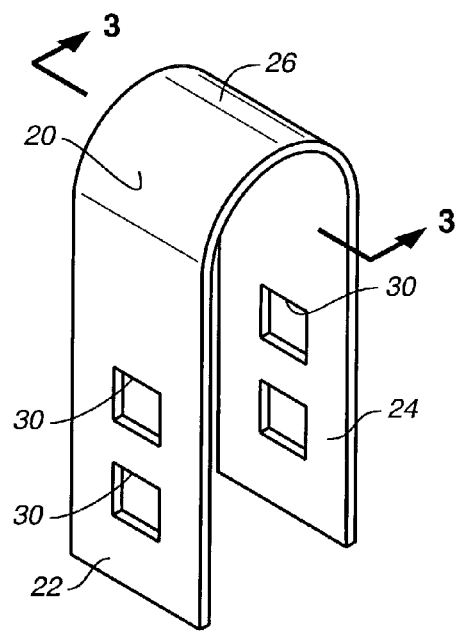
FIG._2
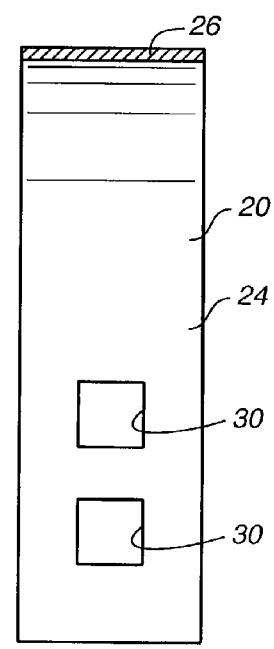
FIG._3

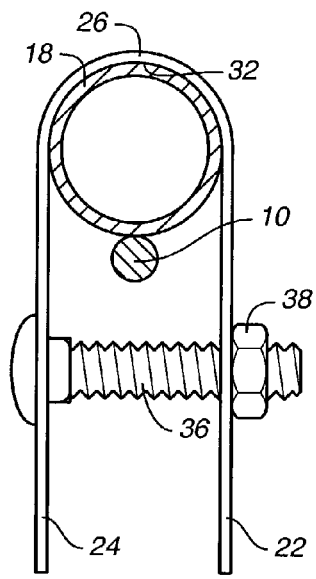
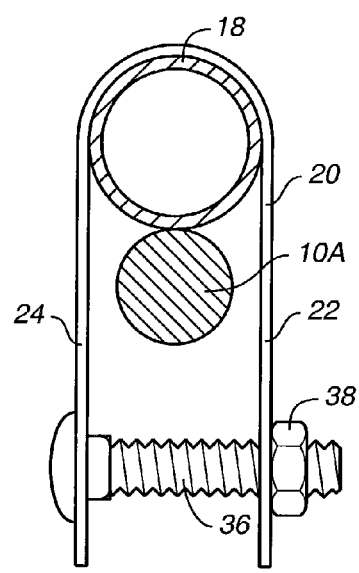
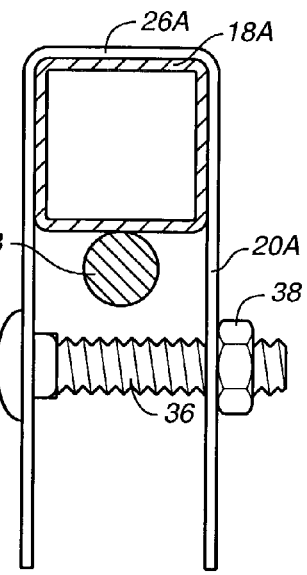
FIG._4A  FIG._5A  FIG._6A
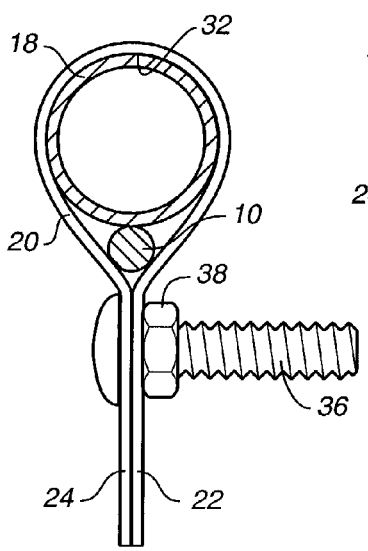
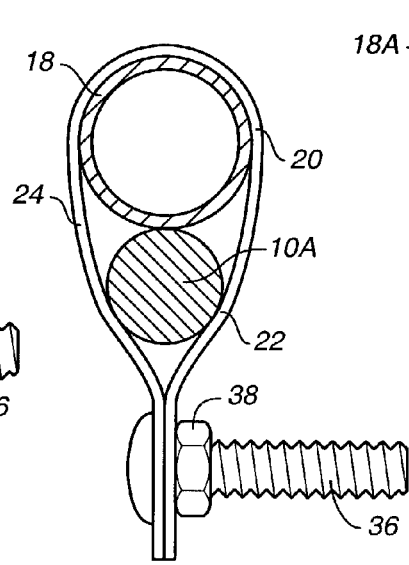
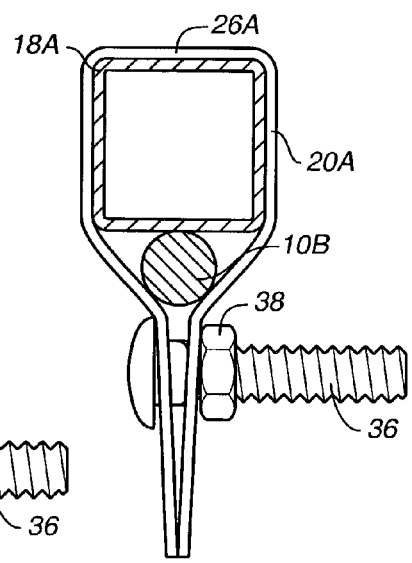
FIG._4B  FIG._5B  FIG._6B

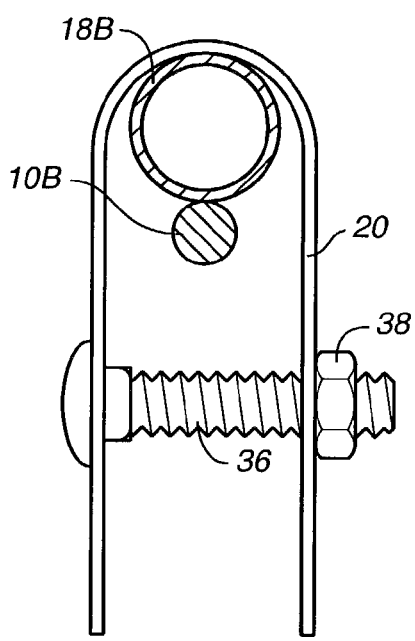
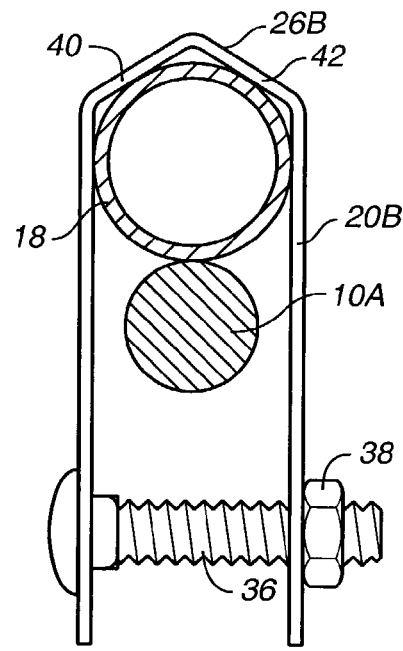
FIG._7A  FIG._8A
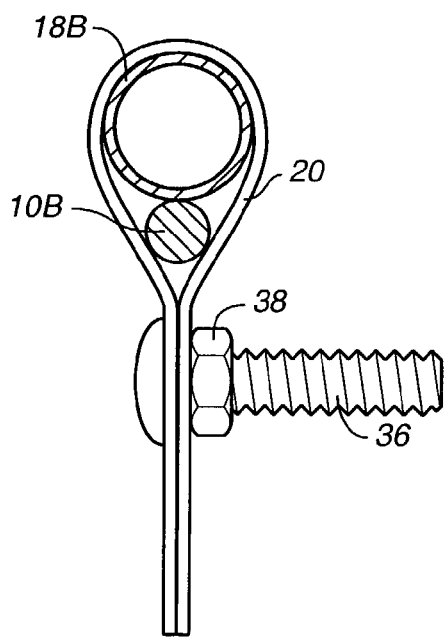
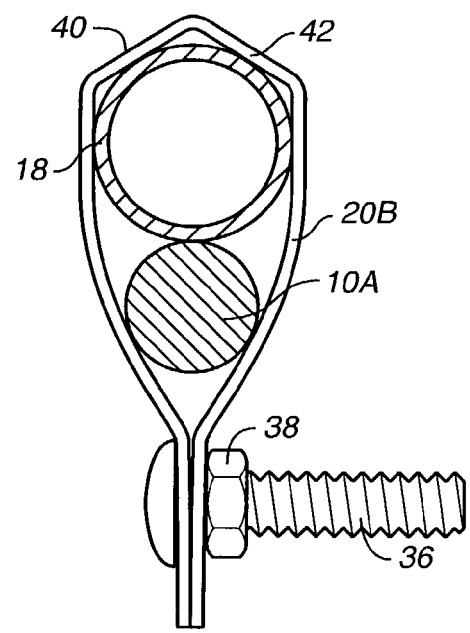
FIG._7B  FIG._8B

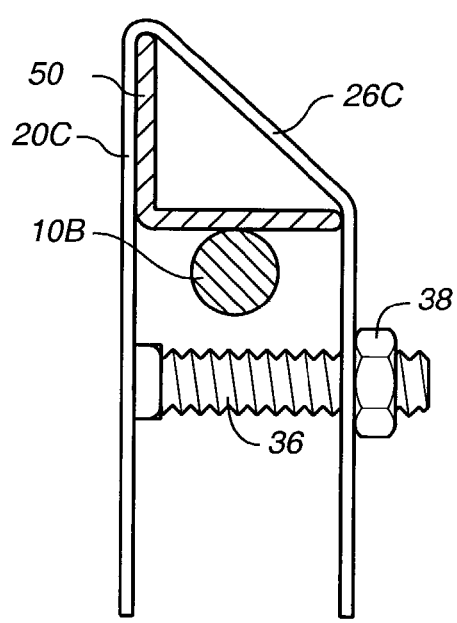
FIG._9A
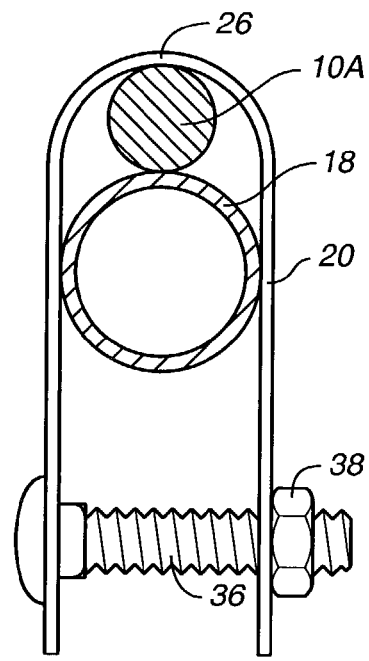
FIG._10A
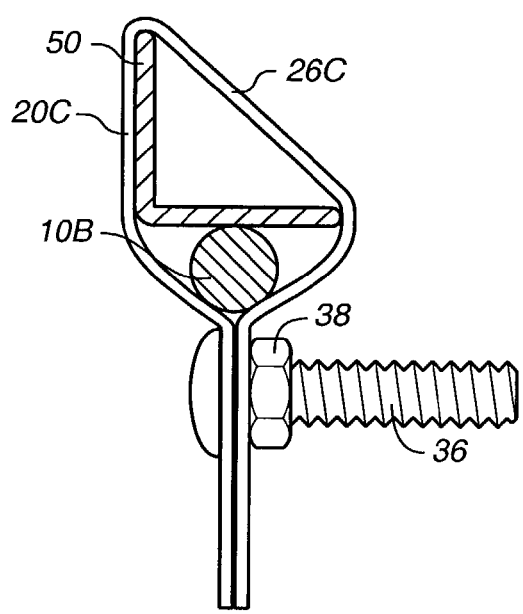
FIG._9B
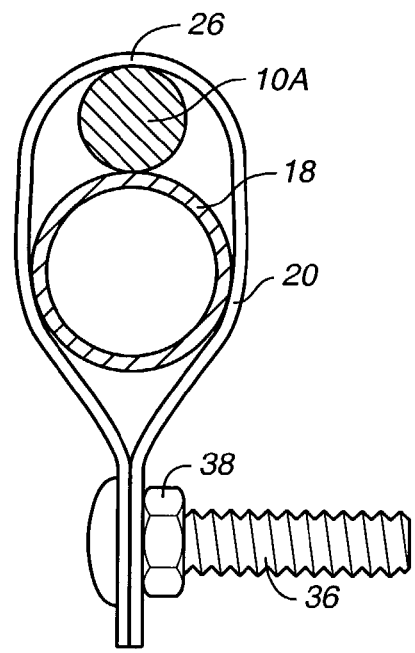
FIG._10B

DEFORMABLE CLAMP EMPLOYED TO STIFFEN HANGER ROD

This application is a continuation-in-part of U.S. patent application Ser. No. 09/927,801 filed Aug. 9, 2001, now abandoned, which in turn is a continuation-in-part of U.S. patent application Ser. No. 09/610,501, filed Jul. 6, 2000, U.S. patent application Ser. No. 09/836,955, filed Apr. 17, 2001, now U.S. Pat. No. 6,454,232, and U.S. patent application Ser. No. 09/870,077, filed May 30, 2001, now abandoned.

TECHNICAL FIELD

This invention relates to apparatus employed in the building construction industry and more particularly to stiffener apparatus for stabilizing a hanger rod employed to hold or support pipes, conduits or other components of a building from building structures.

BACKGROUND OF THE INVENTION

Various types of assemblies or devices have been devised for stabilizing or stiffening hanger rods, for example, for seismic bracing purposes. Such devices are often, but not always, associated with multi-directional bracing for electrical conduit, cable trays and mechanical piping systems. One common type of hanger rod stiffener assembly is that exemplified by the SC228 hanger rod assembly and the B22 channel combination made available by B-Line Systems, Inc. of Franklin Park, Ill. in which a clamp is disposed inside the channel rod stiffener to capture the threaded hanger rod and stiffen it.

Another well known approach is that exemplified by the SC-UB hanger rod stiffener assembly utilized with the B22 channel, also made available by B-Line Systems, Inc., wherein a U-bolt is connected to a flat two-hole plate by hex nuts, the threaded hanger rod being captured between the rounded portion of the U-bolt and the channel.

It is also known to use bolts similar to U-bolts but which are straight, rather than curved, at the closed end thereof, the straight closed end being orthogonal to the threaded legs of the bolt. Hanger rod slippage is a problem with this arrangement.

It is also known to weld hanger rod to a stiffener. This is time consuming and expensive. Furthermore, such a connection is permanent and a stiffener is not removable from the rod once welded into place.

All of the prior art arrangements noted above are characterized by their relative complexity, high expense and labor intensive installation.

The following U.S. patents are of record in above-identified U.S. patent application Ser. No. 09/927,801. U.S. Pat. No. 5,004,194, U.S. Pat. No. 5,482,234, U.S. Pat. No. 4,944,683, U.S. Pat. No. 4,318,518, U.S. Pat. No. 1,804,472, U.S. Pat. No. 3,310,264, U.S. Pat. No. 3,121,549, U.S. Pat. No. 1,318,503, U.S. Pat. No. 4,856,739, U.S. Pat. No. 2,416,063, U.S. Pat. No. 4,441,677, U.S. Pat. No. D273,762, U.S. Pat. No. 706,903, U.S. Pat. No. 5,564,659, U.S. Pat. No. 5,284,110, U.S. Pat. No. 1,457,106, U.S. Pat. No. 1,362,244, and U.S. Pat. No. 3,316,605.

The prior art does not teach the invention disclosed and claimed herein.

The invention disclosed in my co-pending U.S. patent application Ser. No. 09/870,077, referenced above, relates to a rod stiffener arrangement utilized to stabilize a hanger rod and which is readily employable to stiffen hanger rods of varying diameters. It also can utilize elongated stiffener members of differing shapes and sizes.

The stiffener arrangement is for stabilizing a hanger rod and includes a clamp having first and second clamp segments formed of deformable material as well as a third clamp segment integral with and located between the first and second clamp segments. Each of the first and second clamp segments has a distal end spaced from the third clamp segment.

At least one mechanical fastener extends between the first and second clamp segments. The mechanical fastener is spaced from the third clamp segment and fastens the first and second clamp segments together.

An elongated stiffener member having an outer surface is disposed in a space defined by the first, second and third clamp segments along with the hanger rod extending parallel to the elongated stiffener member.

The mechanical fastener, upon tightening thereof, causes formation of bends in the first and second clamp segments conforming to the shape of and engaging the portion of the outer surface of the elongated stiffener member to urge the elongated stiffener member to a predetermined position relative to the hanger rod and the clamp and maintain the elongated stiffener member at said predetermined position.

DISCLOSURE OF INVENTION

The present invention also relates to a rod stiffener arrangement utilized to stabilize a hanger rod and which is readily employable to stiffen hanger rods of varying diameters. It also can utilize elongated stiffener members of differing shapes and sizes. The invention is characterized by its relatively low cost and ease of use. Installation is easily and inexpensively accomplished.

The stiffener arrangement of the present invention is for stabilizing a hanger rod and includes a clamp having first and second clamp segments formed of deformable material as well as a third clamp segment integral with and located between the first and second clamp segments. Each of the first and second clamp segments has a distal end spaced from the third clamp segment.

At least one mechanical fastener extends between the first and second clamp segments. The mechanical fastener is spaced from the third clamp segment and fastens the first and second clamp segments together.

An elongated stiffener member having an outer surface is disposed in a space defined by the first, second and third clamp segments along with the hanger rod extending parallel to the elongated stiffener member.

The mechanical fastener, upon tightening thereof, causes deformation of the first and second clamp segments whereby the first and second clamp segments engage a portion of the outer surface of the hanger rod, the hanger rod being disposed between the at least one mechanical fastener and the elongated stiffener member and the elongated stiffener member being in engagement with the third clamp segment, deformation of the first and second clamp segments operable to urge the hanger rod toward the elongated stiffener member and maintain the elongated stiffener member and the hanger rod parallel and in side by side engagement.

Other features, advantages and objects of the present invention will become apparent with reference to the following description and accompanying drawings.

BRIEF DESCRIPTION OF DRAWINGS

FIG. 1 is an elevational view illustrating a hanger assembly including a hanger rod stiffened by apparatus constructed in accordance with the teachings of the present invention, including three clamps in position on the hanger rod and an elongated stiffener member in the form of a conduit;

FIG. 2 is a perspective view of a clamp constructed in accordance with the teachings of the present invention;

FIG. 3 is a cross-sectional view taken along the line 3—3 of FIG. 2;

FIGS. 4A and 4B are cross-sectional views taken along the line 4B in FIG. 1, FIG. 4A showing the clamp prior to tightening and FIG. 4B showing the clamp tightened by a threaded fastener associated therewith;

FIGS. 5A and 5B are views similar to FIGS. 4A and 4B, respectively, but illustrating a larger diameter hanger rod than that shown in FIGS. 4A and 4B;

FIGS. 6A and 6B are views similar to FIGS. 4A and 4B, respectively, but showing an alternate form of clamp and stiffener member as well as a somewhat larger diameter hanger rod;

FIGS. 7A and 7B are views similar to FIGS. 4A and 4B, respectively, showing a clamp having the configuration of that of FIGS. 4A and 4B employed with a smaller diameter stiffener member;

FIGS. 8A and 8B are views similar to FIGS. 4A and 4B, respectively, but illustrating a third embodiment of clamp employed with a larger diameter hanger rod;

FIGS. 9A and 9B are views similar to FIGS. 4A and 4B, respectively, but showing a fourth clamp embodiment and another form of elongated stiffener member; and FIGS. 10A and 10B show use of a clamp of the type shown in FIGS. 1–4B, but utilized in the manner disclosed in my co-pending U.S. application Ser. No. 09/870,077.

MODES FOR CARRYING OUT THE INVENTION

FIG. 1 illustrates a conventional hanger assembly including a threaded hanger rod 10 and a pipe holder bracket or yoke 12 supported thereby. Nuts 14, 16 connect the yoke to the hanger rod. The upper end of the hanger rod (not shown) depends from building structure, such as ceiling structure, in a well known manner. The threaded hanger rod has a predetermined diameter and length and has a substantially cylindrically-shaped, threaded outer peripheral surface.

In order to stiffen the hanger rod and structure supported thereby against seismic movement or movement induced by other means, an elongated stiffener member in the form of a conduit, pipe or tubing 18 is positioned alongside the threaded hanger rod and in engagement therewith. Conduit 18 has a longitudinal axis extending parallel to the longitudinal axis of the hanger rod. Conduit 18 has a cylindrically-shaped outer peripheral surface with a diameter greater than the diameter of the hanger rod, the length of the conduit being no greater than the length of the hanger rod and typically less than the length of the hanger rod.

In the illustrated embodiment, three clamps 20 are employed to tightly secure the conduit 18 and hanger rod together. The clamps are spaced from one another. Suitable structural bracing such as wires, connector rods, brackets and the like (not shown) may be affixed to clamps 20 and secured to adjacent building structure to prevent undesired movement of the hanger assembly, the support member and clamps, for example movement caused by an earthquake.

Each clamp 20, as shown in FIGS. 1–4B, is of integral construction. The clamp is formed of deformable material, suitably sheet metal.

Clamp 20 has a first clamp segment 22 and a second clamp segment 24, each of which has a distal end. A third clamp segment 26, spaced from the distal ends, is integral with and located between the first and second clamp segments. The first and second clamp segments define openings 30 located between the distal ends thereof and the third clamp segment. In the embodiment being described, two such openings are formed in each of the clamp segments 22, 24.

The third clamp segment includes two interconnected curved third clamp segment elements of equal length diverging outwardly relative to one another from a location of interconnection thereof in the direction of said first and second clamp segments to define a first recess 32 at the closed end of the clamp.

FIG. 4A shows clamp 20 in place on the hanger rod and elongated stiffener member or conduit and extending laterally from the hanger rod and conduit. The conduit and hanger rod are disposed in a space defined by the first, second and third clamp segments, and a threaded bolt 36, the hanger rod extending parallel to the elongated stiffener member with the longitudinal axes thereof being parallel. The stiffener conduit or member 18 is positioned in recess 32 between the third clamp segment and the hanger rod 10. That is, the hanger rod and third clamp segment are disposed on opposite sides of the elongated stiffener member and a nut 38 extends through two of the aligned openings 40. The threaded bolt and nut are spaced from the threaded hanger rod and disposed on a side of the hanger rod opposed to the side of the threaded hanger rod engaged by the conduit.

Next, the nut is tightened so that the first and second clamp segments are moved toward one another as shown in FIG. 4B. It will also be noted that bends are formed in the clamp segments 22, 24 as tightening takes place so that the deforming first and second clamp segments conform to the shape of a portion of the outer surface of the hanger rod. The bent first and second clamp segments converge in the direction of the threaded bolt to define a second recess away from recess 32 and accommodating the hanger rod. The first and second recesses comprise separate portions of the internal clamp space. The first and second clamp segments are spaced from one another between the outer surface of the hanger rod and the threaded bolt. Furthermore, forces are applied by the bent clamp segments 22, 24 to a portion of the hanger rod urging the hanger rod in the direction of the elongated stiffener member and third clamp segment 26 to a predetermined position in the clamp wherein the hanger rod and conduit are in tight engagement. The hanger rod is thus locked into place in the clamp along with the conduit and maintained in tight engagement therewith when tightening of the nut and bolt is terminated.

The deformation of the first and second clamp segments during tightening results in the hanger rod being disposed between the mechanical fastener and the elongated stiffener member. The elongated stiffener member is also in a fixed predetermined position relative to the hanger rod and clamp, maintained parallel and in side by side engagement with the hanger rod. Upon tightening of the nut, the hanger rod is brought into tight engagement with the first and second clamp segments to prevent sliding of the clamp in an up or down direction. The threaded hanger rod is disposed along a line extending from a location substantially midway between the first and second clamp elements where the threaded bolt extends between those segments and the longitudinal axis of the conduit. Centering of the hanger rod and conduit relative to one another is automatically accommodated during tightening of the nut. This arrangement is strong and highly stable.

It has been found that tightening of the nut 38 causes torquing of one or more of the clamp segments, causing an edge or edges thereof to bite into either or both of the threaded hanger rod and conduit to further secure the components FIG. 5A is a view similar to FIG. 4A, but illustrating the clamp 20 accommodating a larger diameter hanger rod 10A. In this installation the threaded bolt 36 is disposed in the outermost set of openings to provide sufficient spaced to accommodate the conduit and larger diameter hanger rod. It will be appreciated that the first and second clamp segments 22, 24 shown in FIG. 5A will also bend, as shown in FIG. 5B, when the mechanical fastener is tightened to curve around into contact with that portion of the hanger rod opposed to stiffener member or conduit 18. This will force the conduit 18 and hanger rod 10A into tight engagement with each other as well as force the conduit into tight engagement with third clamp segment 26.

FIGS. 6A and 6B illustrate a second embodiment of a clamp, clamp 20A, constructed in accordance with the teachings of the present invention. Clamp 20A differs from clamp 20 in that the third clamp segment 26A is straight, rather than curved. In this instance, the elongated stiffener member 18A is tubular and has a rectangular cross-sectional configuration. Clamp segment 26A bears against a flat side of the stiffener member. When the mechanical fastener is tightened, the other clamp segments bend under the hanger rod 10B to urge the hanger rod into tight clamped relationship with the elongated stiffener member, as shown in FIG. 6B.

The clamp 20 shown in FIGS. 7A and 7B is the same as that in FIGS. 1–4B; however, in this instance the conduit 18B is smaller than conduit 18. By positioning the threaded nut and bolt at the set of aligned openings closes to the curved end of the clamp, the clamp can be utilized to clamp together the conduit 18B and the hanger rod 10B.

FIGS. 8A and 8B illustrate another clamp embodiment, clamp 20B. In this embodiment the third clamp segment 26B includes two straight portions 40, 42 which are of equal length and are angularly disposed relative to one another. Tightening of the threaded fastener causes the other two clamp segments to deform and exert a caming action on hanger rod 10A, urging it toward conduit 18.

FIGS. 9A and 9B illustrate yet another clamp embodiment, clamp 20C, which is utilized with a channel 50 having an L-shaped cross-section and serving as the elongated stiffener member. In this embodiment, the third clamp segment 26C is disposed diagonally relative to the other clamp segments and the other clamp segments are of different lengths. Tightening of the threaded fastener will cause the hanger rod 10B to bear against one of the legs of the channel, as shown in FIG. 9B.

FIGS. 10A and 10B show a channel 20 of the type illustrated in FIGS. 1–4B employed to hold together as a unit a hanger rod 10A and a conduit 18. In this instance, the positions of the hanger rod and the conduit are reversed, the hanger rod 10A disposed between clamp segment 26 and the conduit 18. This relative positioning of these two components is shown in my aforementioned U.S. patent application Ser. No. 09/870,977, the aforementioned U.S. patent application Ser. No. 09/870,977, the FIGS. 10A and 10B merely being used to show that the clamp 20 can also be used to maintain these relative positions. The positioning of the hanger rod between the elongated support member and the threaded connector allows a greater force to be applied to the clamp by the threaded connector without failure of the elongated support member.

The invention claimed is:

1. In combination:
    a vertically disposed threaded hanger rod of predetermined diameter and length having a longitudinal axis and a substantially cylindrically-shaped, threaded outer peripheral surface; and
    stiffener apparatus stabilizing said threaded hanger rod, said stiffener apparatus comprising:
    a clamp integrally constructed of deformable sheet metal having deformable first and second clamp segments and a deformable third clamp segment integral with and located between said first and second clamp segments, each of said first and second clamp segments having a distal end spaced from said third clamp segment, said first and second clamp segments defining openings spaced from said third clamp segment, and said third clamp segment including two interconnected, curved third clamp segment elements diverging outwardly relative to one another from a location of interconnection thereof in the direction of said first and second clamp segments to define a first recess, said first, second and third clamp segments having clamp segment outer edges, and said clamp extending laterally from said threaded hanger rod;
    a threaded bolt extending between said first and second clamp segments through said openings at a location on the clamp spaced from said third clamp segment;
    a nut threadedly engaged with said threaded bolt, said threaded bolt and nut fastening together said first and second clamp segments with said first and second clamp segments converging in the direction of said threaded bolt to define a second recess, said second recess being spaced from said first recess;
    an elongated stiffener member with a longitudinal axis having an outer peripheral surface greater than the diameter of said threaded hanger rod and having a length no greater than the length of said threaded hanger rod extending parallel to said threaded hanger rod with the longitudinal axes of said elongated stiffener member and threaded hanger rod being parallel, said elongated stiffener member being located in said first recess and having a side thereof in engagement with a side of said threaded hanger rod and having said outer peripheral surface thereof disposed in a space defined by said first, second and third clamp segments and said threaded bolt along with said threaded hanger rod, said first and second recesses comprising separate and adjacent portions of said space, said threaded bolt and nut being spaced from said threaded hanger rod and disposed on a side of said threaded hanger rod opposed to the side of said threaded hanger rod engaged by said elongated stiffener member, and said first and second clamp segments being spaced from one another between the outer surface of the threaded hanger rod and the threaded bolt, and said nut upon tightening thereof causing interaction between said clamp and said threaded hanger rod resulting in deformation of said first and second clamp segments to decrease the size of said second recess and form bends in said first and second clamp segments causing said first and second clamp segments to partially surround the threaded hanger rod and conform to the shape of and engage a portion of the outer surface of said threaded hanger rod in opposition to said elongated stiffener member to urge the threaded hanger rod and said elongated stiffener member toward one another and into direct tight engagement and continuously maintain the threaded hanger rod and said elongated stiffener member in direct tight engagement and further maintain the first and second clamp segments in direct tight engagement with the threads of the threaded hanger rod to resist sliding of the clamp on the threaded hanger rod, said deformation of said first and second clamp segments further resulting in said threaded hanger rod being brought into direct tight engagement with both said first clamp segment and said second clamp segment to resist sliding of the clamp and position said threaded hanger rod in said second recess with said threaded hanger rod disposed along a line extending from a location substantially midway between said first and second clamp segments where said threaded bolt extends between said first and second clamp segments and the longitudinal axis of said elongated stiffener member and also resulting in deformation of said third clamp segment to cause said third clamp segment to conform to the shape of the elongated stiffener member with said third clamp segment in direct tight engagement with said elongated stiffener member, at least one of said first, second and third clamp segments being in torqued condition resulting from deformation thereof with a clamp segment outer edge thereof biting into at least one of said elongated stiffener member and said threaded hanger rod to resist relative movement between the clamp and said elongated stiffener member and said threaded hanger rod.

2. The combination according to claim 1 wherein a plurality of spaced openings are defined by each of said first and second clamp segments.

3. The combination according to claim 1 including a plurality of said stiffener apparatuses spaced from one another.

* * * * *